United States Patent [19]

Halleux

[11] Patent Number: 4,847,112

[45] Date of Patent: Jul. 11, 1989

[54] SURFACE TREATMENT OF A ROLLING MILL ROLL

[75] Inventor: Jacques Halleux, Richelle, Belgium

[73] Assignee: Centre De Recherches Metallurgiques-centrum Voor Research in de Metallurgie, Brussels, Belgium

[21] Appl. No.: 149,823

[22] Filed: Jan. 29, 1988

[30] Foreign Application Priority Data

Jan. 30, 1987 [LU] Luxembourg ............................ 86753

[51] Int. Cl.[4] .............................................. B05D 3/06
[52] U.S. Cl. .................................... 427/53.1; 156/643; 219/121.63; 219/121.64; 219/121.65; 219/121.66; 219/121.68
[58] Field of Search ....................... 427/53.1; 156/643; 219/121 LL, 121 LD, 121 LE, 121 LF, 121 LH

[56] References Cited

U.S. PATENT DOCUMENTS

| | | | |
|---|---|---|---|
| 4,400,408 | 8/1983 | Asano et al. | 427/53.1 |
| 4,401,726 | 8/1983 | Gnanamuther | 427/53.1 |
| 4,434,189 | 2/1984 | Zaplatynsky | 427/53.1 |
| 4,537,793 | 8/1985 | Kehres et al. | 427/53.1 |
| 4,566,938 | 1/1986 | Jenkins et al. | 427/53.1 |
| 4,684,781 | 8/1987 | Frish et al. | 427/53.1 |
| 4,746,540 | 5/1988 | Kamasaki et al. | 427/53.1 |

FOREIGN PATENT DOCUMENTS 61-210189  9/1986  Japan .................................. 427/53.1

Primary Examiner—Stanley Silverman
Attorney, Agent, or Firm—Fleit, Jacobson, Cohn, Price, Holman & Stern

[57] ABSTRACT

A process for surface treatment of a rolling mill roll coated with a coating of metal wherein the coated roll is surface heated, e.g. by a continuous laser beam in a helical path to melt the coating and a thin superficial layer of the roll thereby forming an uninterrupted molten alloy layer comprising at least a part of the coating and of the superficial layer of the roll, cooling the alloy layer, and marking the roller by an intermittent laser beam, e.g. following the same helical path with a given delay to produce local fusion of the alloy layer and of the roll surface beneath the alloy layer and form microcraters having bases and rims integrated, after solidification, with the alloy layer.

13 Claims, 1 Drawing Sheet

SURFACE TREATMENT OF A ROLLING MILL ROLL

BACKGROUND OF THE INVENTION

1. Field of Invention

The present invention concerns a process for the surface treatment of a roll for a rolling mill. It relates more particularly to a process for making the surface of a cold-rolling-mill roll for the purpose of imparting controlled roughness to a steel sheet.

2. Description of Prior Art

Various prior proposals of the Assignees of the Applicant, notably their Belgian Pat. No. 870 609, have disclosed a method of marking the surface of a rolling mill roll by means of an intermittent laser beam. This known method enables the formation, in this surface, of micro-cavities or micro-craters which are distributed according to a predetermined pattern and which, being imprinted in the surface of the sheets, impart to the latter the required roughness. When the roll have been used for a certain length of time, they become less rough, and have to be reconditioned in order to recover their original surface condition. A worn roll has to be dismantled from the mill, corrected, marked again, then re-installed and adjustments involved mean loss of time and of substantial expense, which are reflected in the cost of the roll. It is therefore advantageous to space out these reconditionings, i.e. to reduce the rate at which the roughness wears out.

Belgian Patent Application No. BE-A-901 055 discloses a method of improving the life span of mill rolls marked by the above-mentioned method. This method consists in applying a metal coating to the surface of the roll, then treating the coated roll by means of an intermittent laser beam in such a way as to locally fuse the metal coating and the underlying roll surface and thus to instigate the formation of alloyed beads or rims around the micro-craters. By this method one can perceptibly improve the hardness and therefore the life span of the actual beads. It has, however, become evident that the alloyed beads do not always adhere sufficiently to the metal coating and that beads sometimes become torn off during rolling. If this is the case, a bead can be torn off even when the roll has only been used for a short time. The life span of the roll is therefore reduced, and moreover the bead thus detached and carried along can cause deterioration of the surface of the rolled product.

SUMMARY OF THE INVENTION

The object of the present invention is to provide a process whereby the above inconvenience can be removed by improving the securing of the beads or rims so as to prevent their being torn off and to increase the life span of the roll treated in this way.

In accordance with the present invention, the process for surface treatment of a rolling mill roll by means of an intermittent laser beam, in which one applied to at least a part of the surface of the roll a coating consisting, at least partly, of a metal substance, is characterized by; heating the surface of the coated roll to a temperature sufficient to cause fusion or melting of the coating and of a thin superficial layer of the roll; forming on the surface of the roll an uninterrupted layer of molten alloy consisting of at least a part of the coating and of the thin superficial layer of the roll; cooling the layer of molten alloy; and subsequently marking the roll by means of an intermittent laser beam which effects local fusion or melting of the layer of alloy and of the surface of the roll and also the formation of micro-craters whose base and whose bead or rim, once they have solidified, are integrated with the layer of alloy.

The mechanism of the formation of the above-mentioned micro-craters with rims is well known at the present by experts in the field. In the zone of impact of a laser pulse, localized fusion occurs at the surface of the roll, with the molten metal being driven back towards the periphery of this zone. In this way there forms, around the micro-crater with a depressed base thus obtained, a metal rim or bead which solidifies very rapidly because of the very short duration of the laser pulse which has created the rim. This rim plays a very important part in the formation of the controlled roughness of the sheet rolled by means of the roll.

For this purpose, the coated roll is superficially heated at least up to the melting temperature of the metal either of the coating or of the surface of the roll, whichever melting temperature is the higher. Rolling mill rolls are usually of steel, and the coating used here consists preferably of at least one metal selected from chromium, cobalt, and nickel.

According to a particular implementation of the process of the invention, the surface of the coated roll is heated by means of a continuous laser beam.

It has been found of interest to set the coated roll in rotation around its longitudinal axis; to heat the surface of the roll to a temperature sufficient to cause fusion or melting of the coating and of a thin superficial layer of the roll, by means of a first focused continuous laser beam whose impact point describes a helical path on the surface of the coated roll; to cool the layer of alloy formed at the interface between the coating and the surface layer of the roll; and to mark the roll by means of a second focused intermittent laser beam whose impact point describes, with a given delay, the same helical path as the impact point of the first laser beam.

The above-mentioned given delay should preferably be sufficient to allow the layer of alloy melted by the first laser beam to solidify before being struck by the second laser beam. Because of the low thickness of this layer and consequently the low metal masses involved, this solidification is effected within a very short time, usually less than 0.5 seconds.

The above-mentioned helical paths are produced by imparting to the roll a movement of longitudinal displacement in relation to the laser beams or vice versa, with synchronization in such a way that the said paths cover the whole area to be treated on the roll.

BRIEF DESCRIPTION OF THE DRAWINGS

The invention will now be described with reference to the accompanying drawing wherein.

DETAILED DESCRIPTION

In all the FIGS., analogous parts are designated by identical reference numbers; furthermore, parts not directly necessary for understanding the process of the invention are not shown. Finally, the curvature of the roll surfaces has not been taken into account in FIGS. 2 and 3, since this curvature does not play any significant part because of the small diameter (max. 500 μm) of the micro-craters.

Figure 1:
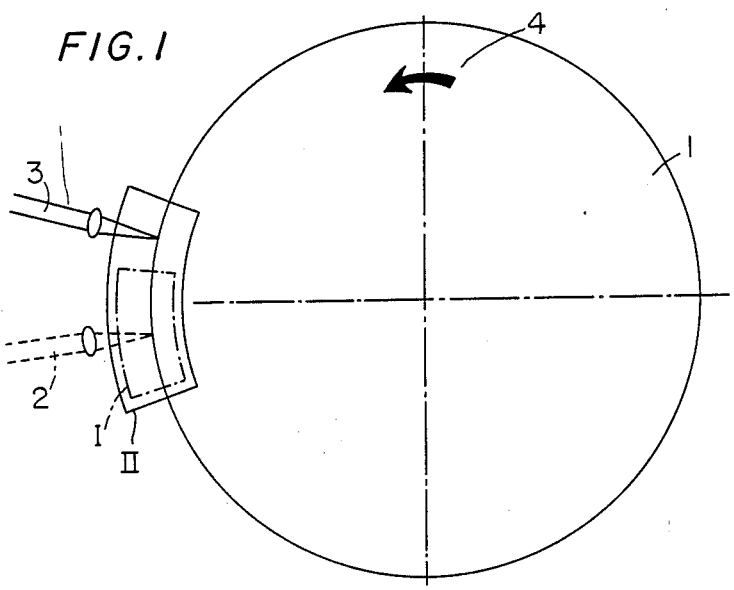
FIG. 1 is a diagrammatic end view of a rolling mill roll and of an assembly which enables micro-craters to be created on the surface of the roll.

FIG. 1 shows a front end view of a mill roll 1 in position for surface marking by means of at least one laser beam (2,3). The roll is rotated around its axis in the direction of the curved arrow 4. The frames I and II in FIG. 1 correspond relatively to the more detailed views shown in FIGS. 2 and 3.

Figure 2:
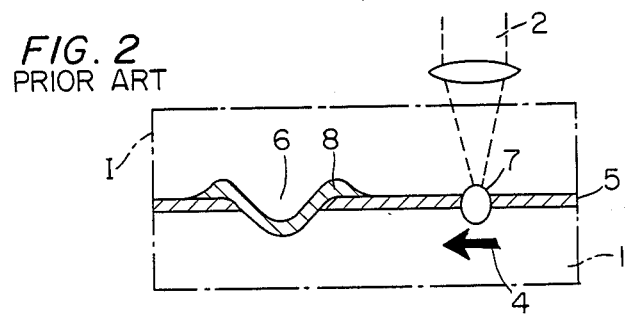
FIG. 2 is a cross-sectional view through the surface of a rolling mill roll, showing a micro-crater obtained by prior art technology.

FIG. 2 shows a section of a micro-crater obtained by the above-mentioned prior art technology. The roll 1 is provided with a metal coating 5 of low thickness applied by any suitable method, for example by electrolysis. The roll thus coated is surface-treated by means of an intermittent laser beam 2 focused on the surface. By the technique recalled above, this laser beam 2 brings about the formation of a series of micro-craters 6 (only one of which is shown) whose base is covered by a layer of metal alloy resulting from the melting at 7 of the coating 5 and of the surface zone of the roll 1. The micro-crater 6 is surrounded by a bead or rim 8 also comprised of this same alloy. FIG. 2 shows clearly that the rim 8 is deposited on the coating 5, to which it does not always adhere in a satisfactory way.

Figure 3:
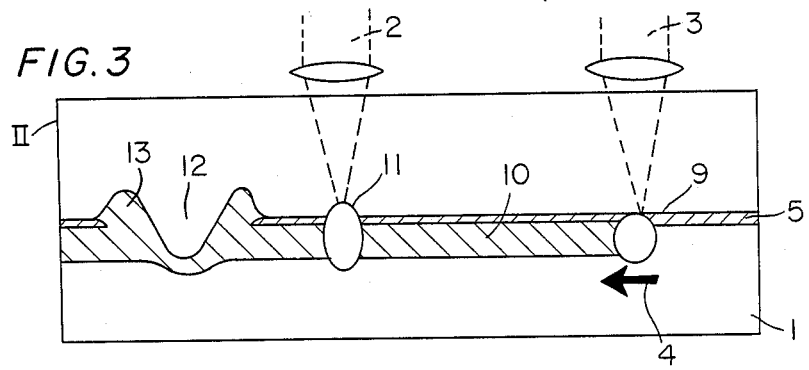
FIG. 3 is a cross-sectional view through the surface of a rolling mill roll, showing a micro-crater produced by a process according to the present invention.

The operation according to the invention, on the other hand, illustrated in FIG. 3, ensures excellent adherence of the rim 8. In FIG. 3, the roll 1 is also provided with a metal coating 5 of low thickness. During its rotation according to the arrow 4, the roll 1 is surface-treated by a first, continuous, laser beam 3 which effects at 9 the fusion of the coating 5 and of the surface zone of the roll 1; thus there is formed on the surface of the roll 1 an uninterrupted alloy layer 10 composed of the metal of the coating and of the material of the roll 1. If the alloying has not reached the entire metal coating 5 melted at 9, the layer 10 may, after cooling and solidification, still have a coating 5 of reduced thickness, as shown. After this, the surface thus prepared is treated by means of a second, intermittent, laser beam 2, which effects further melting at 11 and forms a series of micro-craters 12 (only one of which is shown). In the region of impact of a laser pulse, any residual metal coating 5 is melted with the alloy layer 10; the resulting alloy covers the base of the micro-crater 12 and forms a rim 13 which has substantially the same composition as the layer 10. The base of the micro-crater 12 and its rim 13 are both therefore an integral part of the alloy layer 10. The resistance to being torn off of such a rim 13 is definitely superior to that of the rim 8 which forms the structure in FIG. 2.

In the process of the present invention, the surface of the roll is alloyed with the coating which may be a suitable metal such as chromium, cobalt, or nickel, for example, over its entire extent, before the formation of the micro-craters and the rims which constitute the roughness. Because of this, the whole surface of the roll undergoes hardening which increases its resistance to wear. For example, a roller surface coated simply with a layer of chromium 0.5 μm thick has a Vickers hardness of 500; after treatment by means of a continuous laser beam, this same surface has a Vickers hardness of 1000. Finally, the resistance of the rims to being torn off increases by about 80% in relation to that of the prior art rims.

I claim:

1. In a method for the surface treatment of a rolling mill roll wherein a metallic coating is applied to at least part of the outer surface of the roll and an intermittent laser beam is applied to the coating and outer surface of the roll to form micro-craters in the roll each having a base and a rim which provide a surface roughness on the roll, the improvement comprising:

heating at least a thin superficial layer on at least the part of the outer surface of the roll on which the coating has been applied and the metallic coating to form a molten alloy layer on said outer surface comprised of at least part of said coating and said thin superficial layer; and directing the intermittent laser beam on said roll to produce local fusion of said alloy layer and the surface of said roll beneath said alloy layer and the formation of micro-craters each having a base formed in said alloy layer and a rim integral with said alloy layer.

2. The method as claimed in claim 1 wherein: said heating step comprises directing a continuous laser beam on said roll.

3. The method as claimed in claim 1 and further comprising; rotating the coated roll around the longitudinal axis thereof;

heating the surface of the roll to a temperature sufficient to cause fusion of the coating and of said thin superficial layer of the roll by directing a first focused continuous laser beam on said roll and producing relative movement in the direction of said longitudinal axis between said roll and said first laser beam so that the point of impact thereof describes a helical path on the surface of the coated roll;

cooling said alloy layer formed at the interface between the coating and said superficial layer of the roll; and after a predetermined delay marking the roll by directing said intermittent laser beam focused so that the point of impact thereof describes the same helical path as said point of impact of said first continuous laser beam.

4. The method as claimed in claim 3, wherein: said predetermined delay is sufficient to allow time for said molten alloy layer to solidify before being struck by said intermittent laser beam.

5. The method as claimed in claim 3, wherein: said predetermined delay comprises less than 0.5 seconds.

6. The method as claimed in claim 1 wherein: said coating comprises at least one metal selected from the group consisting of chromium, cobalt, and nickel.

7. A method as claimed in claim 1 and further comprising:

cooling said alloy layer between said heating step and said step of directing said intermittent laser beam on said roll.

8. The method as claimed in claim 3 wherein: said coating comprises at least one metal selected from the group consisting of chromium, cobalt, and nickel.

9. The method as claimed in claim 4 wherein:

said coating comprises at least one metal selected from the group consisting of chromium, cobalt, and nickel.

10. The method as claimed in claim 5 wherein:

said coating comprises at least one metal selected from the group consisting of chromium, cobalt, and nickel.

11. The method as claimed in claim 2 wherein:

said directing of said intermittent laser beam on said roll is delayed for a predetermined time sufficient to allow said molten alloy layer to solidify.

12. The method as claimed in claim 11 wherein:

said predetermined time comprises less than 0.5 seconds.

13. The method as claimed in claim 11 wherein:

said coating comprises at least one metal selected from the group consisting of chromium, cobalt, and nickel.

* * * * *